May 8, 1934. W. C. HYDE 1,957,782
ANIMATED SLIDE ADVERTISING FILM
Filed July 25, 1931 2 Sheets-Sheet 1
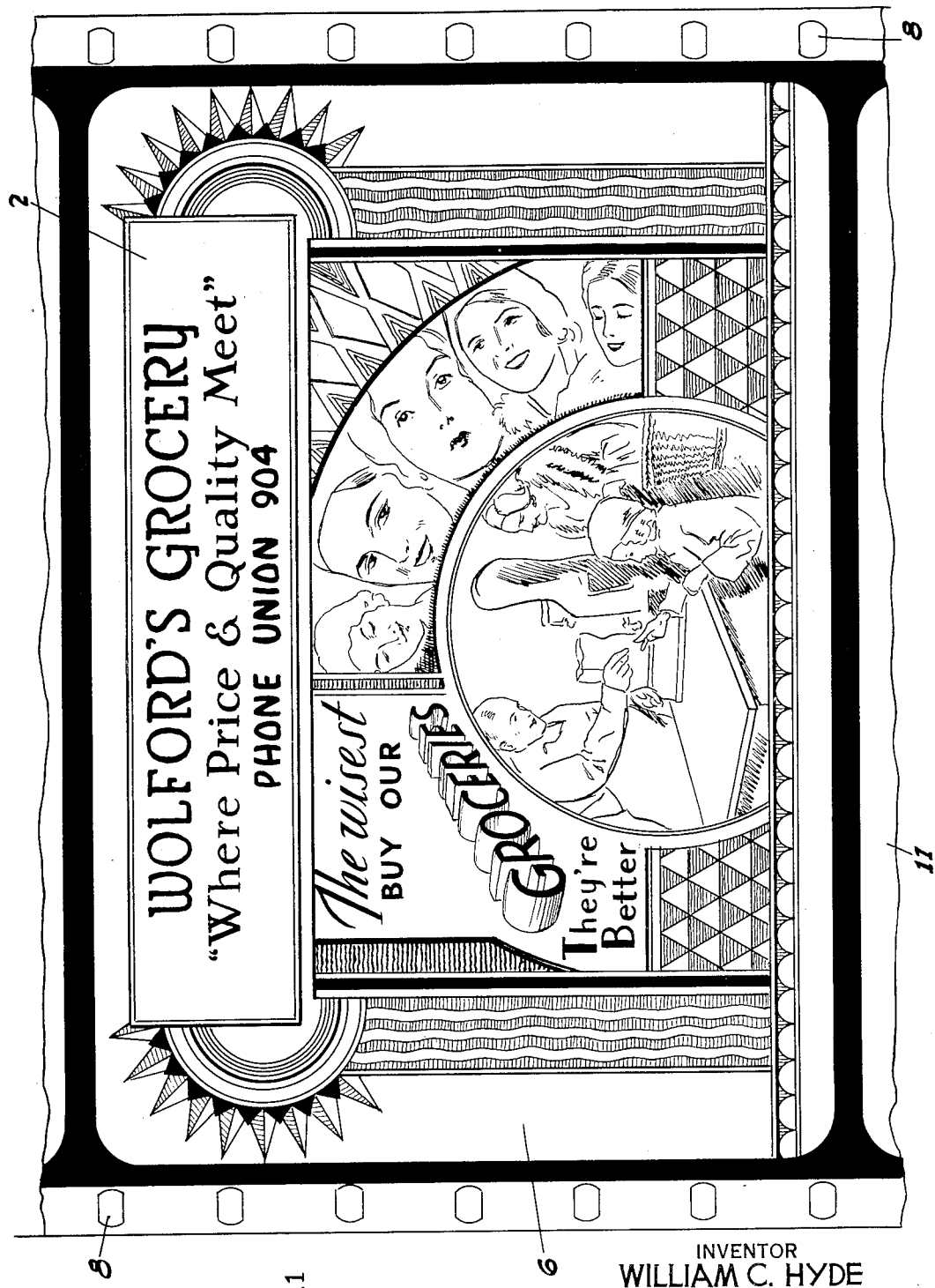
FIG.1
INVENTOR
WILLIAM C. HYDE
BY
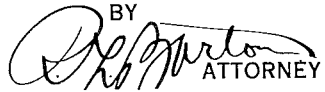
ATTORNEY May 8, 1934.  W. C. HYDE  1,957,782

ANIMATED SLIDE ADVERTISING FILM

Filed July 25, 1931   2 Sheets-Sheet 2

INVENTOR
WILLIAM C. HYDE
BY
ATTORNEY

Patented May 8, 1934

1,957,782

UNITED STATES PATENT OFFICE 1,957,782

ANIMATED SLIDE ADVERTISING FILM

William C. Hyde, San Diego, Calif., assignor to Consolidated Advertising Corp., Ltd., Los Angeles, Calif.

Application July 25, 1931, Serial No. 553,063

1 Claim. (Cl. 95—5)

My invention relates to the manufacture of motion picture film advertising means and it consists in apparatus whereby the antiquated picture slides are supplanted by an animated motion picture film.

The object of the invention is to provide a composite advertising and scenario animated film adapted particularly to be shown in theaters in cities in conjunction with the regular feature film.

Another object of the invention is to provide a unitized advertising and scenario film whereby the footage run is greatly shortened, thereby reducing the cost of producing the film and the time for displaying it on the screen.

Another object of the invention is to provide a method and means of screen advertising of such a character that when the scenario is once filmed the service may be syndicated to thousands of advertisers handling the same commodity or similar lines, at a lower cost to the consumer, simply by a mere interchanging or substitution of names of different tradesmen within a window portion left blank on the original scenario film.

Another object of the invention is to provide a means of screen advertising whereby the entire medium of the theater field may be approached without the censure of the theatre-going public.

Still other objects may hereinafter appear.

In the drawings, Fig. 1 is a face view of one of the picture areas which recur with variations as the film advances.

Figure 2:
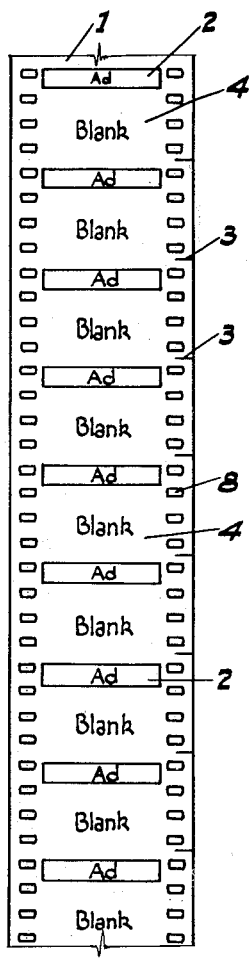
Fig. 2 is a face view of an advertisement and scenario blank film diagrammatically showing the portion of the advertisement film which is to be taken in conjunction with the scenario film to produce the combined advertisement and scenario film.

It is a long established and recognized fact that in cities up to ten thousand population the most successful advertising is through the theater medium on the screen.

The present method of screen advertising consists in the story or scenario first being projected on to the screen and then the name of the advertiser and matter pertaining to his advertising being subsequently added in the form of a trailer. The trailer portion is attached directly to the scenario portion of the film. It has been observed that a very carefully devised scenario will hold the attention of the audience throughout its screening, but when the trailer starts they become restless and impatient and oftentimes object to unnecessary delays on feature films due to the projecting on the screen of a long display of uninteresting detached advertising.

In order to eliminate this restless feeling on that part of the audience wherefrom the manager of the theater draws his trade and to still retain the good graces of the public, as the most direct and beneficial medium of advertising, I have devised an animated advertising film composed of short lengths, whereby the advertisement and the scenario are consolidated, thus not only contributing to please the observer, but to render the screen medium of advertising free from complaint, and also contributing to the revenue and good will of the theater management as a medium through which to work.

Ordinarily the gross expense of the art work on the scenario represents eighty per cent of the production costs. This creates an excessive burden on the small consumer who must meet this expense in order to obtain an artistic film depicting his line of goods. When an advertising reel is produced which meets with public approval and the service, merely by an interchange of names, may be syndicated to thousands, these excessive costs are pro-rated to these thousands, thus bringing the cost to the individual consumer through syndication to an amount enabling him to double his field of advertising.

I am aware that in the field of photography, multiple film printing of scenes and duplication of character has been resorted to. The scope of my invention does not include broadly the double process of printing alone, but that new and novel means of composite advertising whereby the subscriber's name is synchronized with the scenario thereby eliminating the long, tiresome, costly and unappealing trailer, the criticisms of the objectors, re-confirming the screen film medium of advertising, and the opening up of new and better fields through the results accomplished.

Referring to the drawings:

In Fig. 2 the numeral 1 represents a fragmentary portion of a screen reel film whereon are diagrammatically shown a recurring series of definite sensitized areas 2 occurring at regularly spaced intervals. Photographed upon said areas is a subscriber's name or matter with which the scenario portion later to be described is identified throughout the complete projection of the film on the screen. Any number of such advertisement blank films may be provided, a sufficient number at least to provide each of a group of advertisers showing a similar line with a duplicate copy whereby the cost of producing the scenario film may be pro-rated among the members of each group and the service thereby syndicated to all the group at a greatly reduced rate.

Adjacent the side edge of the film 1 is a repetition of subdivisions 3. Between each of said subdivisions, independent of the advertisement areas 2, is a blank space 4 on which the recurring series of screened events of the scenario will be produced when the film 1 is taken in conjunction with the scenario blank film to produce the final or composite film.

Figure 3:
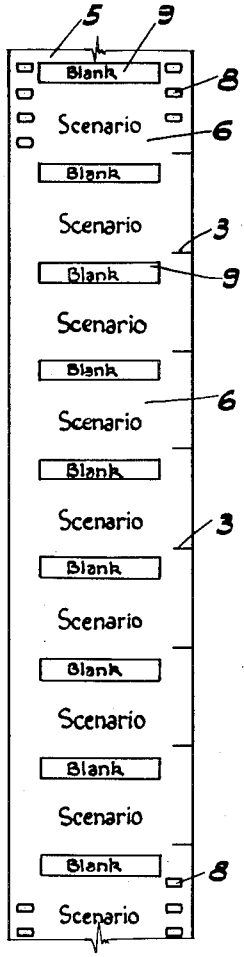
Fig. 3 is a face view of a scenario and advertisement blank film, diagrammatically showing the portion of the scenario film which is to be taken in conjunction with the advertisement film to produce the combined scenario and advertisement film.

In Fig. 3 the numeral 5 represents a fragmentary portion of a screen reel film whereon are diagrammatically indicated a series of photographed events 6 depicting a scenario and a portion of each of the photographed events is adapted for separate animation when the picture is projected on the screen.

The film 5 is identical with the film 1 with respect to the length thereof as well as the number of subdivisions 3 and the trackage apertures 8 at each side of the film.

The film 5 is also provided with areas 9 to be brought into register with the advertisement areas 2 on which the composite film is produced. However, on the film 5 the blank portion which was designated by the numeral 4 in the advertisement blank film 1, is now replaced with the photography of the scenario series 6 as aforestated.

Thus when the advertisement blank film 1 is superimposed over the scenario blank film 5 the advertisements in the window 2 will appear in blank windows 9 of the film 5.

Similarly the scenario photography series 6 recurring on the scenario blank film 5 will appear in register with the blank space 4 of the advertisement blank film 1, the combination thereby producing a perfect matchwork.

The scenario blank film 5 with its blank areas is the basic film. A vast amount of money may be expended in the production of such a film when the expense is pro-rated and the service syndicated to thousands. Thus an attractive film may be photographed which when combined with the filmed name of an advertiser or subscriber, when projected on the screen will meet the approval of the theater-going public.

In each of the advertisement areas 2 occur the different names of the personnel comprising the syndication.

As the service is sold these separate films will match in with the basic scenario film to produce the final or composite advertising film.

Figures 4, 5:
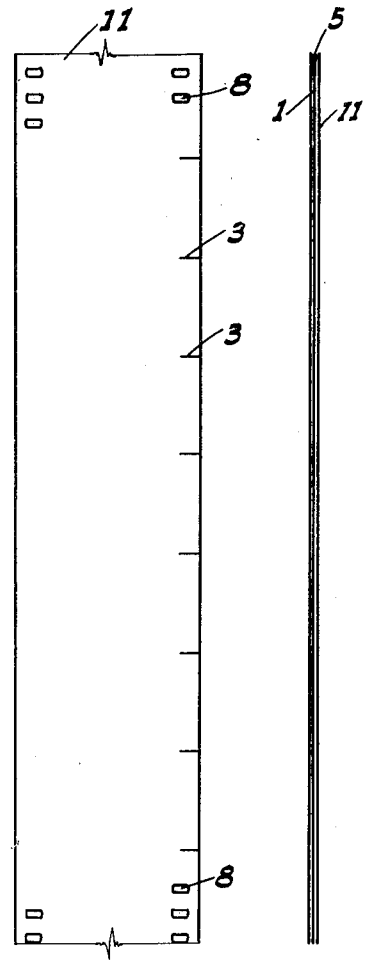
Fig. 4 is a face view of a sensitized film upon which the advertisement and scenario film shown in Figs. 2 and 3 are compounded thus producing the composite film, a fragment of which is shown in Fig. 1.
Fig. 5 is a fragmentary edge view showing the manner of superimposing the advertisement film and the scenario film over the sensitized film whereby the composite third film is produced on the sensitized film.

The final or composite film 11 is fragmentarily shown completed in Fig. 1. It is produced by combinedly exposing the advertisement blank film 1 and the scenario blank film 5 to a sensitized blank film 11 (Fig. 4) in the superimposed manner as indicated by the edge view shown in Fig. 5.

One of a recurring series of scenes is shown in Fig. 1. In this scene is produced the name of the advertiser, a statement relative to the character of his merchandise, striking colors and fascinating action all being upon the screen together. Such a display marks an important advanced step in motion picture advertising.

As aforementioned, less progressive film manufacturers display the merchandise and the dealer's name separately upon the screen. Such a method, as previously pointed out, has serious objections, and is in a sense equivalent to that of an advertiser displaying his mechandise in one medium and his name and address is another.

Through my improved invention the complete story is instantly registered upon the reader's mind. Such an impression is immediately had by referring to a typical screen story produced in Fig. 1. This modern method of construction appeals to every eye and gives an impressive presentation of the advertiser's message.

This composite type of film may be produced in conjunction with sound at the election of the advertiser.

I claim:

The method of preparing a motion picture positive film having alternate scenic and literal matter which consists in preparing a pair of negative stock films each having uniformly spaced sensitized areas and each having complementary blank spaces between said areas, exposing one of said films to receive a scenic representation on its sensitized areas and the other film to receive literal matter on its sensitized areas, developing said films, superimposing one film on the other with the developed areas of one film in staggered relation to the developed areas of the other film, utilizing the united films to print a positive on a third film and developing the third film.

WILLIAM C. HYDE.